UNITED STATES PATENT OFFICE.

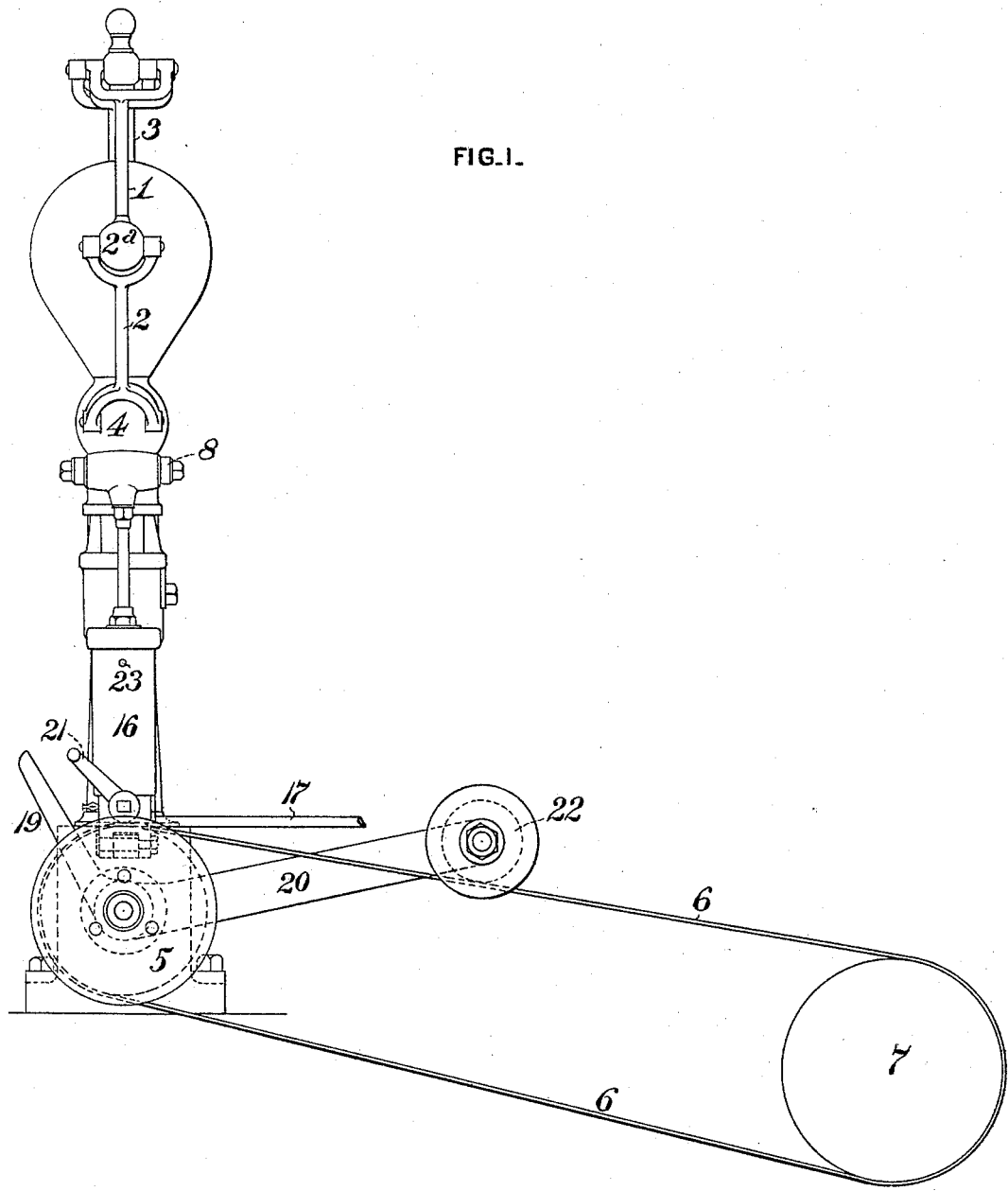

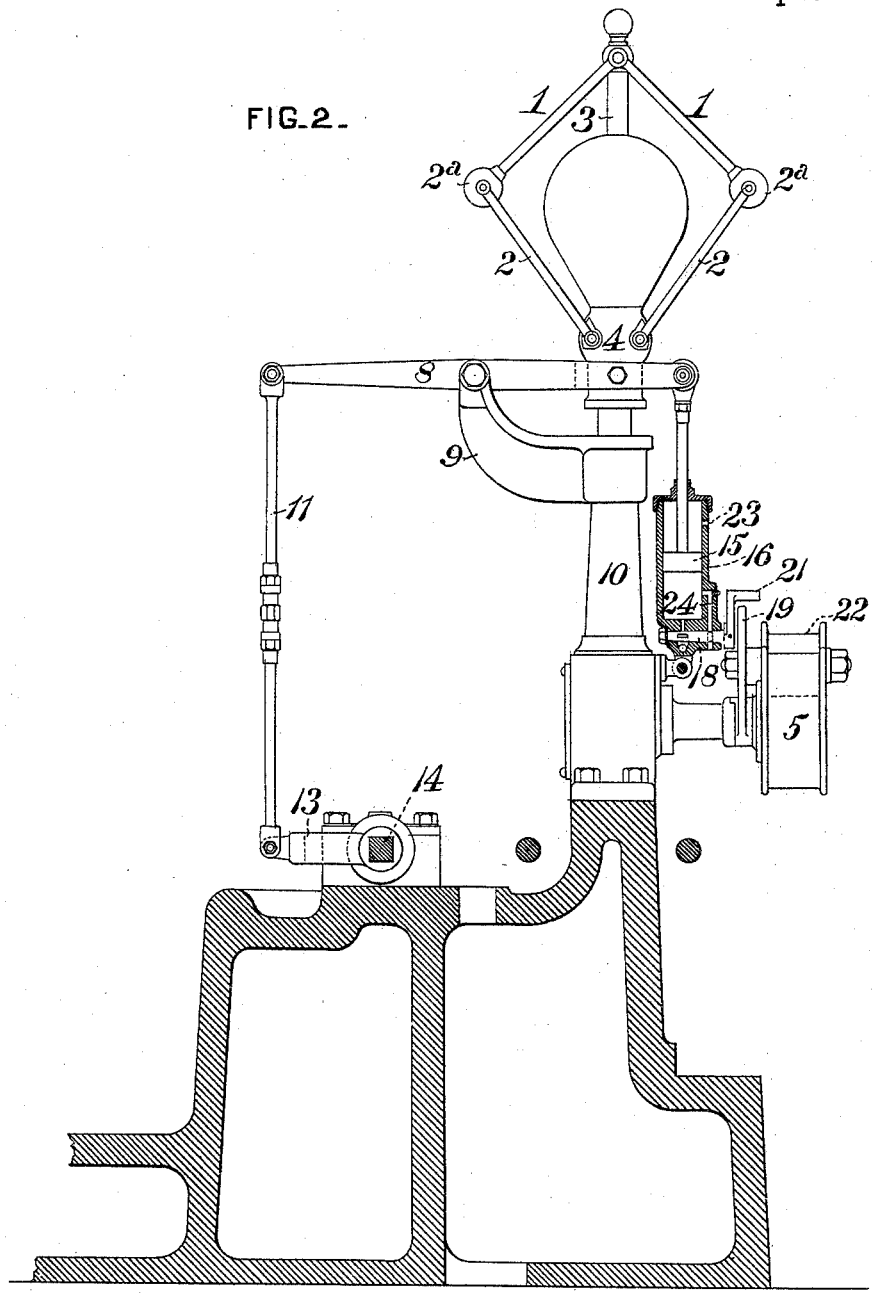

JAMES HEMPHILL AND JOSEPH FAWELL, OF PITTSBURG, PENNSYLVANIA.

GOVERNOR.

SPECIFICATION forming part of Letters Patent No. 482,450, dated September 13, 1892.

Application filed February 15, 1892. Serial No. 421,642. (No model.)

*To all whom it may concern:*

Be it known that we, JAMES HEMPHILL and JOSEPH FAWELL, citizens of the United States, residing at Pittsburg, in the county of Allegheny and State of Pennsylvania, have invented or discovered certain new and useful Improvements in Governors, of which improvements the following is a specification.

The invention described herein relates to certain improvements in governors.

In an application of even date we have described and claimed a construction wherein the pivotal support for the lever transmitting movement from the governor to the engine-valve is removed, thereby permitting the free end of the lever to drop and so shift the valve as to close the inlet-ports of the cylinder. In the present invention provision is made for so actuating the lever in case of rupture of the governor-driving belt to the same or greater extent as would be produced by the governor when driven at an excessive speed.

In general terms the invention consists in the construction and combination substantially as hereinafter more fully described and claimed.

In the accompanying drawings, forming a part of this specification, Figure 1 is a view in side elevation of a governor embodying our improvements; and Fig. 2 is an end elevation of the same, certain parts being shown in section.

In the practice of our invention the arms 1 and 2, extending from the balls 2ª, are connected, respectively, to the head of the vertical shaft 3 and a sleeve 4, adapted to slide up and down the shaft as the balls move in and out. This shaft 3 is rotated through suitable interposed gearing by the pulley 5, which is driven by a belt 6, passing around a pulley 7 on the main shaft of the engine. A lever 8 is pivoted on a bracket 9, extending from the hollow standard 10, surrounding and supporting the vertical shaft 3, and the outer end of this lever is connected by a rod 11 to an arm 13 on the stem 14 of the valve. Back of its pivotal support the lever is connected to the sliding sleeve 4, so that the vertical movement imparted to the sleeve by the balls will produce an oscillation of the valve-stem 14, thereby so oscillating the valve as to close the ports to the cylinder of the engine. As the valve forms no part of the invention herein and as it is within the skill of a mechanic to so connect the lever that it will effect the regulation of a reciprocating as well as an oscillating valve, it is not deemed necessary to show and describe such a valve. The inner end of the lever 8 is connected to the rod of the piston 15 of the fluid-pressure cylinder 16, provided at its lower end with a valve mechanism which is connected by a pipe 17 with a suitable source of fluid-pressure supply. The valve 18 is shifted so as to admit fluid-pressure to the cylinder by an arm 19 on the lever 20 striking the handle 21 of the valve, when said lever drops by reason of the rupture of the belt which supports the lever in normal position. In order to prevent any abrasion of the belt and also to provide sufficient weight to insure a shifting of the valve, the outer end of lever 20 is provided with a flanged wheel 22, under which the belt passes. In case of rupture of the belt, the lever will drop, causing the arm 19 to strike and shift the handle 21 and its valve, so as to admit fluid-pressure into the cylinder. The upward movement of the piston will raise the inner or rear end of the lever 8 and depress its outer end to a sufficient extent as to so shift the valve of the engine as to stop the flow of steam into the cylinder.

As shown in Fig. 2, the cylinder is provided with a small port 23 near its upper end, so as to permit of the free escape of air during the upward movement of the piston; but said port is so located that an air-cushion will be formed at the upper end of the cylinder. It will be observed that the piston will be shifted in the cylinder by the movements of the sleeve 4 in the ordinary governing movements, and in order that the piston may move down freely a port 24 is provided at the lower end of the cylinder for the escape of air therefrom. This port, however, is controlled by the valve 18, which is constructed to close the port 24 when the valve is shifted by the lever 20 to admit fluid-pressure to the cylinder, but when shifted to normal position will open the port 24.

Any other form of centrifugal governor may be employed in lieu of the construction shown.

We claim herein as our invention—

1. The combination of a governor, a lever operated by the governor and connected to the stem of the cut-off valve of a steam-engine, and a fluid-pressure cylinder operative on the rupture of the governor-driving belt to shift the lever in the same direction and to the same or a greater extent than would be produced by the governor at an abnormal speed, substantially as set forth.

2. The combination of a governor, a lever operated by the governor and adapted to regulate the movements of the valve controlling the flow of steam to the cylinder of an engine, a fluid-pressure cylinder having its piston connected to the lever, and a valve mechanism controlling the flow of fluid-pressure to the cylinder and operative on the rupture of the governor-driving belt, substantially as set forth.

3. The combination of a governor, a lever operated by the governor and adapted to regulate the movements of the valve controlling the flow of steam to the cylinder of an engine, a fluid-pressure cylinder having its piston connected to the lever and provided at or near its ends with outlet-ports, and a valve mechanism controlling the flow of the fluid-pressure to the cylinder and of air from the cylinder and operative on the rupture of the governor-driving belt, substantially as set forth.

In testimony whereof we have hereunto set our hands.

JAMES HEMPHILL.
JOSEPH FAWELL.

Witnesses:
DARWIN S. WOLCOTT,
R. H. WHITTLESEY.